July 21, 1936.   L. M. OAKLEY   2,048,512
TEMPERATURE INDICATOR
Filed March 22, 1935
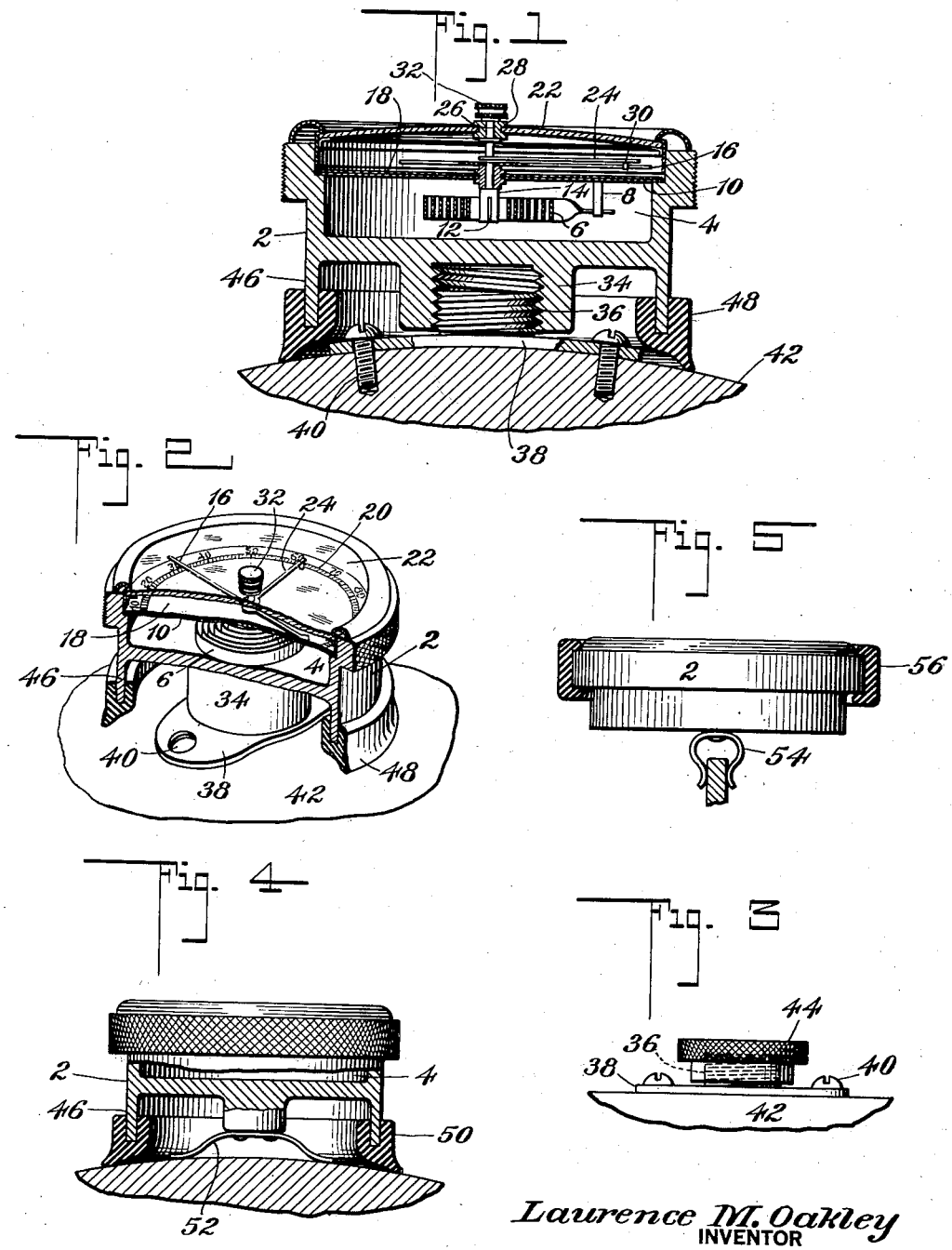
Laurence M. Oakley
INVENTOR
BY Albert Sperry
ATTORNEY Patented July 21, 1936

2,048,512

UNITED STATES PATENT OFFICE 2,048,512

TEMPERATURE INDICATOR

Laurence M. Oakley, Trenton, N. J.

Application March 22, 1935, Serial No. 12,447

2 Claims. (Cl. 73—118)

My invention relates to temperature indicating devices and particularly to devices adapted for use in testing motors, bearings and electric or mechanical elements which have a tendency to become overheated due to faulty operation or during normal operation or for any other reason.

It is well known that motors and generators frequently become overheated and at times burn out due to excess load, insulation failures or for other reasons. Similarly bearings, journals and rotating elements as well as electrical connections, fuses, conductors and many other kinds of electrical and mechanical elements often become overheated or operate in a faulty manner due to excess friction, excess current flow, faulty contact or the like. The amount of increase in temperature of a surface or element above the temperature of the surrounding air is recognized as an indication or measure of the degree of normality of operation.

It has been customary heretofore to determine such overheating simply by feeling the motor or bearing so that it is a matter of experience and guess work as to whether the particular piece of mechanism is operating efficiently and in the proper manner. In some few instances expensive and complicated installations are employed using termocouples or the like, together with indicating instruments to enable an operator to determine when a motor or generator is becoming overheated. However, such devices are expensive and are not portable or capable of application to many devices. In some cases the operator determines the temperature of a bearing, or of an electric or mechanical machine or device by placing an ordinary glass bulb thermometer in contact with the surface to be tested, securing the bulb in place by means of adhesive tape, putty or the like. However, unless the operator is careful such readings are inclined to be uncertain and the thermometer is frequently broken or jarred loose from engagement with the surface to which it is attached and therefore cannot be left as a permanent temperature indicator.

In order to overcome these difficulties in constructions of the prior art I have devised an inexpensive and compact, temperature indicating device which may be either permanently mounted or constructed in a portable form that can be readily applied to motors, bearings, electrical connections and mechanical constructions of any type to faithfully and correctly indicate the temperature of the surface or device to which it is applied. Instruments embodying my invention are also adapted for use on curved or irregular surfaces and serve to prevent the readings obtained from being influenced by the circulation of air about the surface of the device being tested. The device need not be adjusted or watched continually after being applied or when in use and may be used to indicate a maximum or minimum temperature attained over a period of time.

One of the objects of my invention is to provide a novel and inexpensive temperature indicating device adapted to be applied to electrical and mechanical elements.

Another object of my invention is to provide an instrument which in addition to indicating the temperature of a surface at any specific time may also serve to indicate the maximum or minimum temperature attained over any prior time.

Another object of my invention is to provide a novel temperature indicating device which readily permits an observer to see whether the normal safe operating temperature is being, or has been, exceeded.

Another object of my invention is to provide a construction which is small, compact and durable and which may be readily attached and removed from the mechanism on which it is used.

A further object of my invention is to provide a temperature indicating device adapted to be applied to irregular surfaces and to prevent influence of the temperature indicated by the surrounding atmosphere.

These and other objects and features of my invention will appear in the following description thereof in which reference is made to the accompanying figures of the drawing which illustrate typical embodiments thereof.

In the drawing:

Fig. 1 is a vertical sectional view through a typical construction embodying my invention.

Fig. 2 is a perspective of the construction illustrated in Fig. 1 with a portion thereof broken away.

Fig. 3 illustrates the attaching mechanism shown in the construction of Figs. 1 and 2 with a protective cover applied thereto, and Figs. 4 and 5 illustrate alternative embodiments of my invention wherein different forms of attaching mechanisms are employed.

In that form of my invention chosen for purposes of illustration in Figs. 1 and 2 the device comprises a casing 2 formed of a highly conducting metal such as aluminum, copper or the like provided with an upper chamber 4 within which is located a suitable temperature responsive element.

For the purposes of my invention the temperature responsive mechanism and the indicating means employed may be of any desired or suitable construction but I prefer in general to employ mechanism which is small, inexpensive and of durable construction so that the device may be readily manufactured at low cost and so that the instrument may be subjected to severe usage when in service without injury thereto. As shown the temperature responsive element comprises a bi-metallic coiled strip 6 which has one end thereof secured to a post 8 carried by a removable metallic cover plate 10 which closes the upper portion of the chamber 4. The inner end of the coil 6 is secured in a slot 12 in the lower end of a spindle 14 by which an indicating hand 16 is carried. The hand 16 is movable over a dial 18 having a graduated scale 20 thereon to indicate the temperature in degrees or in any other suitable manner. The dial and indicating hand are preferably enclosed within an unbreakable transparent cover or crystal 22 to protect the same and prevent the entrance of dirt.

In some instances it may be desirable to determine the maximum or minimum temperature that a surface or device has attained during a period of time in order to obtain information on the operation of a device without continual observation thereof. For this purpose the device is provided with a second indicator or hand 24 carried by a shaft 26 extending through an opening in the crystal 22 and mounted in a frictional bearing 28. The free end of the hand 24 is formed with a downwardly extending pin 30 positioned to be engaged by the hand 16 as it moves over the scale. The hand 24 is thus caused to move in one direction with the hand 16 as it moves in one direction under the action of the thermo responsive element but is not moved in the reverse direction therewith. The hand 24 will therefore remain in the extreme position to which the hand 16 moves and serves to indicate the maximum or minimum temperature attained during any period of time.

The outer end of the shaft 26 by which the hand 24 is carried is provided with a knurled handle 32 for setting the hand to bring pin 30 into engagement with the hand 16 so that a new reading may be made. Two hands such as the hand 24 may be used for indicating both maximum and minimum temperatures although for the sake of clarity only one such hand has been shown.

In many cases it is desirable that the indicating instrument be constructed so that it can be removed or applied to different electrical or mechanical devices. To this end the lower portion of the casing 2 is provided with suitable heat conducting attaching means such as the threaded nipple 34 which is constructed to engage a threaded boss 36 formed on an attaching plate 38 secured by screws or pins 40 or the like to the surface of an electrical or mechanical device 42 such as a motor, generator, bearing etc. Any number of the attaching plates 38 with their knurled bosses may be employed and these may be attached at suitable points to any number of bearings or points on or within a motor in order that the temperature of each of a number of bearings or points on one or more devices may be examined to determine the temperature and operating conditions thereof.

As shown in Fig. 3 the threaded boss on the attaching members may be protected when not in use by a cover 44. It is then merely necessary for the operator to remove the cover 44 from the threaded boss and apply the indicating device thereto. The attaching member and the nipple 34 on the casing then provide a heat conducting path which transmits heat directly from the surface of the device to be tested to the chamber 2 surrounding the thermo responsive means. The air within the chamber and the cover plate 10 and walls of the chamber thus convey heat by conduction, convection and radiation to the bi-metallic coil or other thermo responsive means so that it rapidly assumes the temperature thereof and gives a quick and accurate reading. The scale 20 may for this purpose be graduated to indicate safety, warning and danger conditions so that the most inexperienced and unskilled workmen can test a large number of devices quickly and accurately. When the secondary hand 24 is employed the device may be left in place as long as desired and periodically reset to determine the maximum or minimum temperature attained during the intervening period.

It will be evident that if it is desired to support the coil 6, or other thermo responsive means, from the walls or base of the casing 2 for better heat transfer this may be done. However the construction shown has the advantage of simplicity of manufacture and assembly due to the fact that the coil 6 and spindle 14 are carried by the removable cover plate 10. This construction has been found in practice to give very satisfactory and accurate results and therefore is here shown for purposes of illustrating my invention.

In order to avoid the errors and discrepancies that are frequently introduced into such readings by air currents passing over the heated surfaces of the elements being tested the marginal portion of the casing 2 preferably is provided with a flange 46 to which is secured or applied a yieldable shield or skirt 48 formed of rubber or other suitable flexible or resilient material which may or may not be wholly or partially formed of a metallic material for engaging the surface about the projecting connection between the element and the casing. The skirt 48 extends below the nipple 34 about the periphery of the casing and thus provides an enclosure of the nipple which forms a dead air space that is not influenced by the surrounding atmosphere. The skirt readily conforms to any curved or irregular shape of the surface engaged thereby so that the same instrument may be applied to the surface of elements of different diameter or with irregular or plane surfaces with equal effectiveness and ease. The skirt also serves to prevent the accumulation of dirt on the under surface of the casing or on the adjacent surface of the device being tested so that the readings are not influenced by presence of foreign matter on these surfaces even when the instrument is left in position for long periods of time or constructed as a permanent installation. Furthermore the resilient skirt serves to urge the device away from the surface of the device producing friction between the threads of the nipple and boss or other attaching means so that the danger of loosening or displacement of the instrument is reduced even when the device to which it is applied vibrates considerably.

While the attaching means shown are convenient and readily secured in place it is sometimes desirable to take readings on devices to which the attaching plates have not been secured. For this purpose as shown in Fig. 4 I may provide the casing 2 with a rubber skirt 50 formed and constructed to act as a suction cup to hold the indicating device in place. One or more metallic conducting members 52 may then be provided to insure rapid heat transfer from the surface to be tested to the casing.

In the alternative I may provide the casing with attaching means as shown in Fig. 5 for securing the device to shafts, bars, electrical conductors, switches or the like. The means here shown is in the form of a spring clip 54 of suitable size and shape to engage a member to be tested and hold the casing in place for taking a reading. When the device is to be used in testing electrical equipment the casing may be provided with a rubber or other electrically insulating cover or finger piece 56 that may be removably or permanently applied thereto to enable the device to be attached to and removed from a conductor or the like without danger to the operator and without turning off the current.

Numerous other forms of attaching means may be used to adapt the same for use on various forms of equipment as either a permanent or a removable attachment and the elements of the device may be changed in form or construction as desired to adapt the same for any particular use. It should therefore be understood that the forms of the device herein shown and described are intended to be illustrative of my invention and are not intended to limit the scope thereof.

What I claim as my invention is:

1. A portable temperature indicator adapted to be applied to each of a plurality of electrical or mechanical devices or to various points on the same device to determine the operating condition thereof comprising a casing, thermo-responsive means carried by said casing, an indicator actuated by said thermo-responsive means, cooperating heat conducting elements on said casing and the device to be tested providing a detachable connection between the same for removably securing the casing to the device and for transmitting heat to the casing and a yieldable shield carried by said casing and surrounding the heat conducting elements on the casing and device to closely engage the surface of said device.

2. A temperature indicating instrument for testing electrical or mechanical devices comprising a heat conducting casing formed of non-ferrous metal of high heat conductivity, thermo-responsive means located in said casing, an indicator actuated by said thermo-responsive means, a cover plate for closing said casing by which said thermo-responsive means and said indicator are carried, heat transmitting means extending between the casing and the device to be tested and a member forming a dead air space about said heat transmitting means.

LAURENCE M. OAKLEY.